Aug. 7, 1962   J. V. SHOEMAKER   3,048,446
WHEEL COVER
Filed April 15, 1958   2 Sheets-Sheet 1
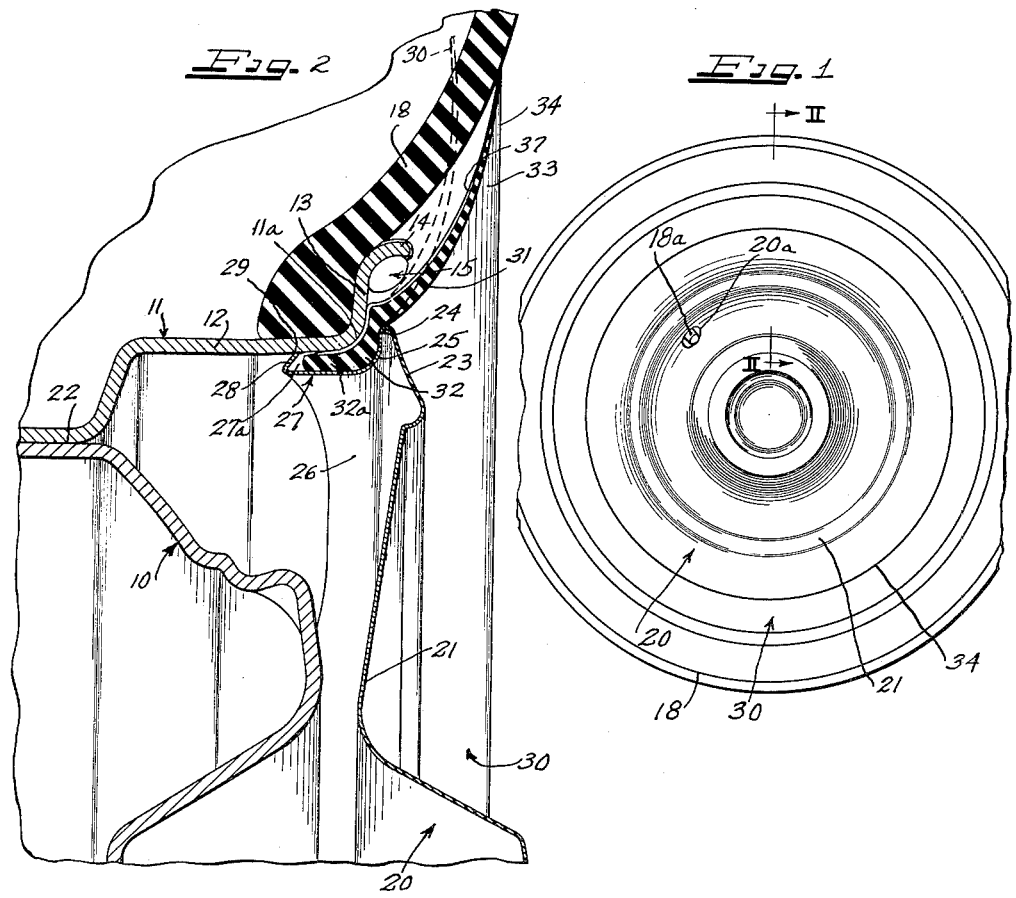
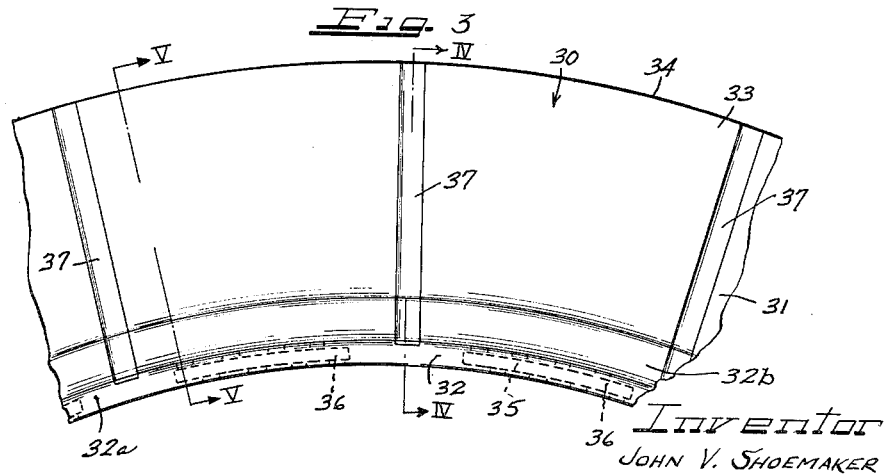
Inventor
JOHN V. SHOEMAKER
by Hill, Sherman, Meroni, Gross & Simpson
Attys.

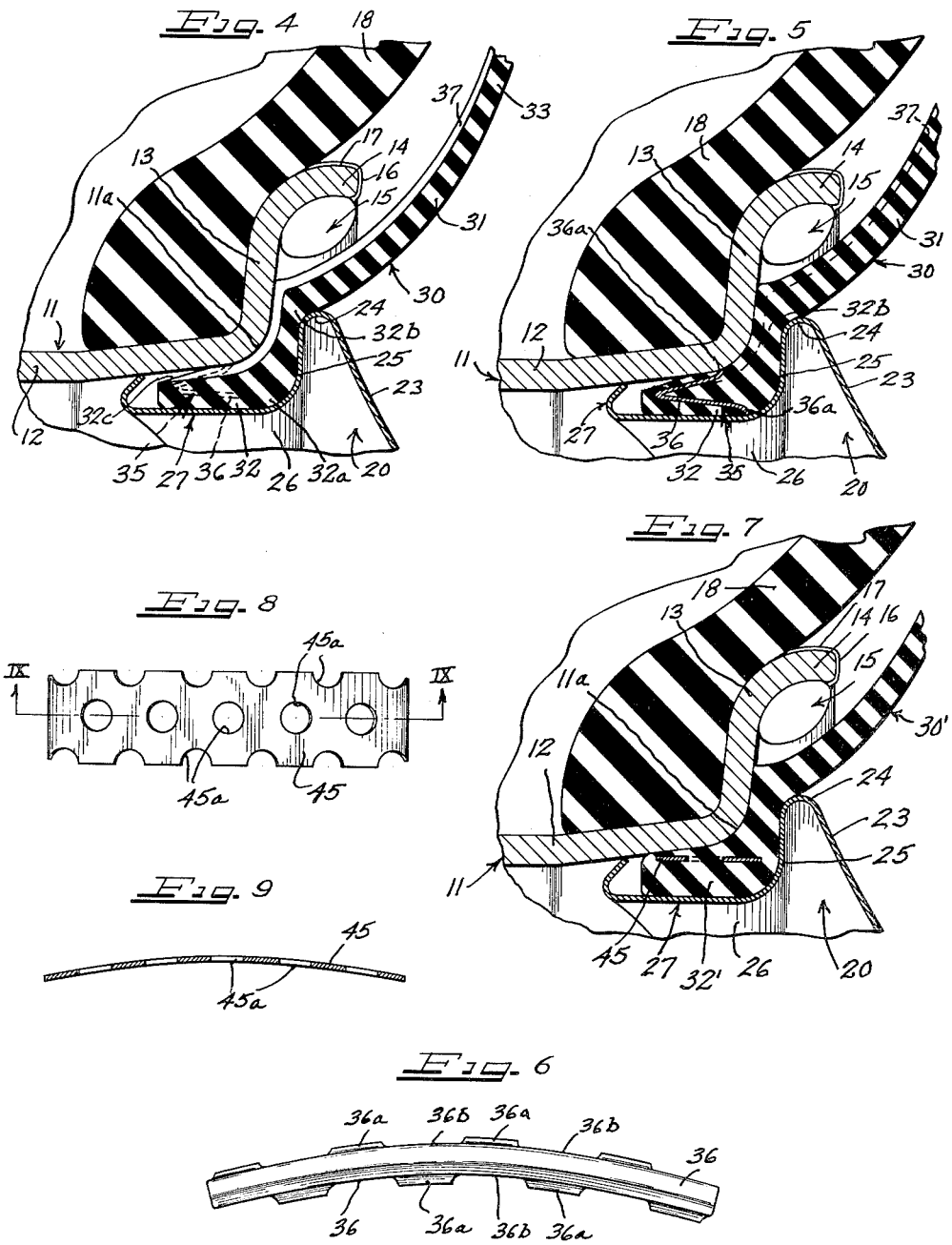

United States Patent Office 3,048,446
Patented Aug. 7, 1962

3,048,446
WHEEL COVER
John V. Shoemaker, Detroit, Mich., assignor to Lyon Incorporated, Detroit, Mich., a corporation of Delaware
Filed Apr. 15, 1958, Ser. No. 728,682
17 Claims. (Cl. 301—37)

The present invention relates to improvements in wheel structures and more particularly concerns the provision of novel means for providing a wheel with a simulated white side wall for a tire on the wheel.

For ornamental purposes, automobile tires are commonly provided with white side walls, the remainder of the tire being of a more or less black appearance. The white rubber used for the white side wall is applied as a veneer and is of a different composition than the remainder or body of the tire and actually requires a different vulcanizing treatment to the extent that the temperature and time of cure are somewhat different than for the black rubber of the tire body. This has created some necessity for compromise in the vulcanization of tires with white side walls generally resulting in a sacrifice of quality in the tire.

To overcome the disadvantages of cure compromise, it has been proposed to secure the white side wall portion or veneer to the side wall of the tire after the tire has been vulcanized. Such after-attached side wall members are inherently liable to such disadvantages as peeling, and the like, and of course require a separate attaching or vulcanizing operation that raises costs.

It has also been heretofore proposed to provide separate simulated white side wall ring members that are secured between the terminal flange of the tire rim and the bead portion of the tire and separably hug the side wall of the tire. Such simulated or mock tire white side wall rings require, of course, that the tire be deflated in order to install the ring members. Should such simulated white side wall rings become damaged, it is necessary to deflate the tire not only to remove the damaged ring but also to replace the ring. Furthermore, a disadvantage of such simulated white side wall rings is that, especially with tubeless tires there is interference with proper sealing, gripping engagement of the tire bead portion with the opposing surfaces of the tire rim. More particularly, when the simulated white side wall ring is clampingly interposed between the tire bead portion and the terminal rim flange some difficulty has been experienced with maintaining an air-tight seal for the tubeless tire.

It is accordingly an important object of the present invention to overcome the foregoing difficulties and disadvantages of the prior expedients and to provide a simulated tire white side wall of improved appearance and which can be applied, or removed, or replaced without disturbing the tire.

Another object of the invention is to provide an improved tire side wall simulating member which serves also as means for covering the tire rim terminal flange as well as concealing wheel balancing weights that may be carried by such flange.

A further object of the invention is to provide a novel tire side wall simulating ring member which is adapted for optional assembly with a wheel cover for disposition over the outer side of the wheel.

Yet another object of the invention is to provide a tire side wall simulating flexible ring device which is adapted to be carried in clamped engagement with the outer side of a tire rim.

It is a further object of the invention to provide cushioning means for a wheel cover, also adapted for providing a simulated tire side wall.

Another important object of the present invention is to provide a tire side wall ring simulating member with drain groove areas enabling water and the like to be centrifugally discharged radially outwardly of the wheel through the drain grooves.

Still another important object of the present invention is to provide novel means for preventing the inner ring margin from oozing radially outwardly from between the tire rim and the cover structure.

Other objects and features of the present invention will be more readily apparent from the following detailed description of certain preferred embodiments thereof, taken in conjunction with the accompanying drawings in which:

FIGURE 1 is an outer side elevation view of a wheel structure embodying features of the present invention;

FIGURE 2 is an enlarged fragmentary cross-sectional view taken substantially on the line II—II of FIGURE 1 looking in the direction indicated by the arrows;

FIGURE 3 is an enlarged fragmentary rear elevation of a tire side wall ring simulating member;

FIGURE 4 is an enlarged fragmentary cross-sectional view similar to FIGURE 2 but with the section through the ring member being taken on the line IV—IV of FIGURE 3 looking in the direction indicated by the arrows;

FIGURE 5 is an enlarged fragmentary cross-sectional view similar to FIGURES 2 and 4 but with the section through the tire side wall ring simulating member being taken on the lines V—V in FIGURE 3 looking in the direction indicated by the arrows;

FIGURE 6 is an enlarged plan view of an arcuate interlock band as shown in FIGURES 1-5;

FIGURE 7 is an enlarged fragmentary cross-sectional view similar to FIGURE 5 only illustrating a modified interlock structure;

FIGURE 8 is a plan view of the interlock structure shown in FIGURE 7; and

FIGURE 9 is a cross-sectional view taken substantially on the line IX—IX of FIGURE 8 looking in the direction indicated by the arrow.

Referring to FIGURES 1, 2, 4, 5, and 7, an automobile wheel including a disk spider wheel body 10 supports a tire rim 11 including an outer generally axially extending intermediate rim flange 12, a generally radially outwardly extending rim flange 13 and an arcuate generally axially extending terminal rim flange 14. Carried upon the terminal rim flange at circumferentially spaced intervals are wheel balancing weights 15 each of which is provided with a resiliently deflectable clip structure 16 which has a leg 17 adapted to be moved radially from the wheel balancing weight portion and released after the wheel balancing weight structure has been telescoped over the terminal rim flange to thereby sustain the wheel balancing weight structure on the tire rim.

A pneumatic tire 18 of preferably the tubeless type is carried by the tire rim. The pneumatic tire has a valve stem 18a to allow inflation of the tire 18.

For disposition at the outer side of the wheel and in covering relation to the wheel body 10, as well as substantially covering relation to the tire rim 11, there is provided a wheel cover member indicated generally at 20 which is preferably of the self-retaining type generally embodying features such as those covered in Lyon patent, No. 2,707,449. To this end, the cover 20 includes an intermediate annular dished portion 21 of a diameter to overlie the radially inner portion of the tire rim as well as the junction between the tire rim 11 and the wheel body 10 as indicated at 22. The cover 20 is provided with a generally radially outwardly axially inwardly inclined marginal portion 23 which in turn terminates in an annular arcuate shoulder indicated generally at 24. Disposed on the underside of the margin 23 and connected to the arcuate annular shoulder 24 is a generally radially inwardly extending annular flange 25 which is in axially spaced relationship to the outer cover margin 23. Connected to the radially inner end of the annular cover portion 25 is an annular axially extending cover portion 26 which in turn terminates in circumferentially spaced return-bent type of retaining finger structure designated generally at 27. The finger structure 27 includes a generally radially and axially inclined terminal 28 terminating in circumferentially spaced rim engaging edges 29 for retaining the cover upon the wheel. The edges 29 are arranged in a common circle having a diameter slightly smaller than the inside diameter of the intermediate rim flange 12 so that when the resiliently deflectable fingers 27 are applied to the wheel they are resiliently deflected in a manner whereby the edges 29 are placed under a degree of tension to bite into the intermediate rim flange 12 to retain the cover structure upon the wheel.

Referring now to FIGURES 1-5, for affording the appearance of the tire 18 having a white or colored side wall, a ring member 30 is provided which preferably is made from a rubber-like material and for which a synthetic material or rubber such as butyl is especially desirable. Such synthetic material or rubber is characterized by especially desirable form resilient flexibility, good color qualities and excellent durometer control.

The ring member 30 includes an intermediate arcuate ring portion 31 which connects together a radially inner stepped ring margin 32 and a radially outer ring margin 33. For affording tire side wall simulating shape for the ring member 30, the intermediate portion 31 is of generally axially outwardly curved transverse or radial shape for bridging over the terminal rim flange 14 and which ring member at its outer margin 33 terminates in a thin, and in this instance substantially feather edge radially outer extremity 34 engageable against the side wall of the tire with a fine line generally merging effect so that the ring member 30 appears on the wheel as though it were an integral side wall portion of the tire. The outside diameter of the ring member 30 of the tire engaging edge 34 thereof, is such that the edge 34 engages against the tire side wall on the incurve of the outer side wall.

At its radially inner ring margin 32 is an axial inner marginal portion 32a and a radial inner marginal portion 32b. Embedded within the axial portion 32a there is provided interlock structure indicated generally at 35 which comprises circumferentially spaced chunks of material 36. Each of the chunks 36 is comprised preferably of a relatively hard material such as steel and in the form shown in FIGURES 1-6 is of a generally V-shape cross-sectional shape with the bottom of the V opening axially outwardly.

As is evident from FIGURE 6 the chunk 36 comprises a channeled arcuate band having along its outer margin a radially outer row of circumferentially spaced finger-like projections 36a which are separated from one another by recessed areas 36b. The band also has a radially inner row of circumferentially spaced projections 36a and recessed areas 36b (FIGURE 6). In the manufacture of the tire side wall ring member 30 the bands 36 may be placed in the molds and formed integral with the inner stepped margin 32 of the ring 30.

With the formation of the inner stepped ring margin 32 portions of the material of the margin are lodged within the recessed areas 36b to interlock the band 36 in the inner ring margin 32. By this means the bands 36 may be positively positioned within the inner stepped ring margin 32 in a predetermined manner.

Provided at circumferentially spaced intervals along the axially inner surface of the tire ring member 30 are generally radially outwardly extending grooved areas 37 each of which extends the entire radial extent of the tire side wall ring member and which are adapted to allow fluids, dirt and the like to be moved radially and axially outwardly of the cover 20 as well as the ring member 30. By this expedient accumulations of fluid and dirt may be minimized at the underside of the cover 20 and the ring member 30.

To assemble the cover 20 with the ring member 30 the axial portion 32a of the inner ring margin 32 may be engaged in pocket area 27a defined by the finger structure 27 by engaging a portion of the annular axial inner margin area 32 within the pocket area 27a and then stretching the opposite portion of the axial portion of the inner margin thereby elastically stretching the material of thet inner ring margin and then releasing the inner ring margin after it is in position for the inner ring margin portion 32a to be engaged within the pocket area 27a along its entire annular extent. By this procedure the ring and cover members may be assembled together. The beveled edge 32c aids the assembly of the ring 30 on the rim flange 12.

The cover and ring assembly may then be aligned with the wheel by aligning the cover opening 20a with the valve stem 18a and applying an axially inward force to the assembly with the fingers 27 being resiliently deflected into cover retaining engagement with the intermediate rim flange 12. When the cover member and the ring members are in full assembly upon the wheel the axially outer stepped surface of the inner ring margin is engaged with the cover surfaces 24, 25 and 26 in nesting relation in a manner whereby the fingers 27 operate to exert a degree or pressure on the inner ring margin 32 to bottom the inner ring margin against the annular rim shoulder 11a disposed at the junction of the rim flanges 12 and 13. When the inner ring margin is bottomed against the wheel the ends of the finger-like projection 36a are abutted against the inside surface of the rim flange 12 providing an additional resistance factor to the radial displacement of the ring member from the wheel when the ring member and cover are assembled thereon.

When the ring member 30 is engaged upon the wheel the intermediate ring portion 31 as well as the outer ring margin 33 are deflected axially outwardly as is evident from the dotted and full line positioning of the ring member 30 in FIGURE 2. By this relationship the outer feather edge 34 is placed under a slight degree of tension with regard to the tire 18. It will be appreciated the ring member 30 is rendered more flexible through the intermediate ring portion 31 as well as the outer ring margin 33 by virtue of the fact that the thickest cross-sectional area of the ring is disposed at the inner ring margin 32. Radially outwardly of the inner thickened ring margin 32, the ring member is progressively tapered in a manner whereby the cross sectional thickness of the ring member is progressively diminished in a radially outwardly direction and which ring terminates in the relatively thin feather edge 34.

From a consideration of FIGURES 4 and 5, it is evident that not only do the finger-like projections 36a engage against the intermediate rim flange 12 but it is also apparent that they engage against the annular cover portion 26 with the dimension between the row of rim engaging projections and the row of the cover engaging projections being slightly larger than the axial dimension of the gap between the rim junction 11a and the annular cover portion 25 so that it is not readily possible for the axially inner ring marginal portion 32a to ooze out and escape from underneath the cover.

To remove the ring and cover assembly from the wheel a pry-off tool may be either inserted underneath the arcuate cover shoulder 24 or the ring portions 31 and 33 may be deflected radially inwardly and axially outwardly so that a pry-off tool may also be inserted underneath the radial inner ring marginal portion 32b. In either case upon applying a suitable pry-off force to the tool the fingers 27 may be released from gripping engagement with the intermediate rim flange 12.

Shown in FIGURES 7 and 8 is a modified form of my invention whereby a ring 30' is shown clamped to the tire rim 11 by means of the cover 20. The cover is of an identical construction as the cover shown in the first form. The ring construction 30' differs from that previously shown in that there is embedded within an annular stepped inner ring marginal portion 32' a modified type of circumferentially spaced arcuate chunks or bands of relatively hard material which preferably comprises spring steel and which are designated generally at 45. The band 45 has longitudinally spaced recessed areas indicated generally at 45a, some of which are circular and others of which are semi-circular in configuration. It will be noted that the axial dimension of the bands 45 is greater than the axial dimension of the gap defined between the rim shoulder 11a and the annular cover portion 25. The bands 45 serve the purpose to prevent the inner ring margin 32' from being accidentally displaced from underneath the cover when the cover and ring members are in assembly upon the wheel.

The cover 20 and the ring 30' may be assembled together and mounted and removed from the wheel in the same manner as previously described.

It will be understood that modifications and variations may be effected without departing from the scope of the novel concepts of the present invention.

I claim as my invention:

1. In a wheel structure including a tire rim having a terminal rim flange and a pneumatic tire mounted on the tire rim, a wheel cover structure for concealing the wheel including a non-metallic tire side wall ring simulating member spaced from and bridged over the terminal rim flange with its outer margin adapted for engagement against the tire and with its inner annular stepped margin adapted for abutment against the tire rim, said inner stepped margin having means for discharging water and dirt during the rotation of the wheel structure which tends to collect on an axially outer side of the tire rim comprising circumferentially spaced generally axially and radially outwardly extending grooved areas on the axially inner side of the annular stepped margin defining drain grooves for allowing water to be discharged radially of the wheel structure, and a cover structure having means for retaining itself upon the wheel and with a portion of the cover structure bearing against the annular stepped margin clamping the tire side wall ring simulating member in assembly upon the wheel.

2. In a wheel structure including a tire rim having an intermediate and terminal rim flanges and a pneumatic tire mounted on the tire rim, a wheel cover structure for concealing the wheel including a non-metallic tire side wall ring simulating member spaced from and bridged over the terminal rim flange with its outer margin adapted for engagement against the tire and with its inner annular stepped margin adapted for abutment against the tire rim, said inner stepped margin having means for discharging water and dirt during the rotation of the wheel structure which tends to collect on an axially outer side of the tire rim comprising circumferentially spaced generally axially and radially outwardly extending grooved areas on the axially inner side of the annular stepped margin facing the tire rim and defining drain grooves for allowing water to be discharged radially of the wheel structure, and a cover structure having its outer margin turned under forming an underturned annular cover flange area, said cover flange area having circumferentially spaced resiliently deflectable cover retaining extensions retainingly engageable with the intermediate rim flange, said inner stepped margin bottomed against the tire rim and bearing against the intermediate rim flange and with the underturned annular cover flange area bottomed against the inner stepped margin retainingly clamping it against the tire rim.

3. In a wheel structure including a tire rim having intermediate radial and terminal rim flanges and a pneumatic tire mounted on the tire rim, a wheel cover structure for concealing the wheel and a non-metallic tire side wall ring simulating member bridged over the terminal rim flange with its outer margin adapted for engagement against the tire and with its inner stepped ring margin adapted for engagement with the intermediate and radial rim flanges but spaced radially inwardly of the terminal rim flange, said cover having a cover area bearing against the ring to secure the ring on the wheel, there being a gap between said cover area and the tire rim, said stepped inner ring margin including axial and radial inner ring marginal portions with the axial ring portion having means embedded within the material of the non-metallic tire side wall ring member to prevent radial pull-out of the ring simulating member when mounted in assembly with a wheel cover on a vehicle wheel, said means comprising circumferentially spaced strip-like elements extending circumferentially of the wheel in the axial inner ring marginal portion and formed to resist being displaced radially through said gap between the cover structure and the tire rim.

4. In a wheel structure including a tire rim having intermediate radial and terminal rim flanges and a pneumatic tire mounted on the tire rim, a wheel cover structure for concealing the wheel and a non-metallic tire side wall ring simulating member bridged over the terminal rim flange with its outer margin adapted for engagement against the tire and with its inner stepped ring margin adapted for engagement with the intermediate and radial rim flanges but spaced radially inwardly of the terminal rim flange, said cover having a cover area bearing against the ring to secure the ring on the wheel, said stepped inner ring margin including axial and radial inner ring marginal portions with the axial ring portion having means embedded within the material of the non-metallic tire side wall ring member to prevent radial pull-out of the ring simulating member when mounted in assembly with a wheel cover on a vehicle wheel, said means comprising strip-like elements extending circumferentially of the wheel in the axial inner ring marginal portion and formed to resist being displaced radially between the cover structure and the tire rim, said strip-like elements having recessed areas with the material of the ring extending transversely through the recessed areas interlocking the elements and ring together.

5. In a wheel structure including a tire rim having intermediate radial and terminal rim flanges and a pneumatic tire mounted on the tire rim, a wheel cover structure for concealing the wheel and a non-metallic tire side wall ring simulating member bridged over the terminal rim flange with its outer margin adapted for engagement against the tire and with its inner stepped ring margin adapted for engagement with the intermediate and radial rim flanges but spaced radially inwardly of the terminal rim flange, said cover having a cover area bearing against the ring to secure the ring on the wheel, said stepped inner ring margin including axial and radial inner ring marginal portions with the axial ring portion having means embedded within the material of the non-metallic tire side wall ring member to prevent radial pull-out of the ring simulating member when mounted in assembly with a wheel cover on a vehicle wheel, said means comprising strip-like elements extending circumferentially of the wheel in the axial inner ring marginal portion and formed to resist being displaced radially between the cover structure and the tire rim, said strip-like elements being V-shaped with the V opening axially outwardly of the wheel.

6. In a wheel structure including a tire rim having intermediate radial and terminal rim flanges and a pneumatic tire mounted on the tire rim, a wheel cover structure for concealing the wheel and a non-metallic tire side wall ring simulating member bridged over the terminal rim flange with its outer margin adapted for engagement against the tire and with its inner stepped ring margin adapted for engagement with the intermediate and radial rim flanges but spaced radially inwardly of the terminal rim flange, said cover having a cover area bearing against the ring to secure the ring on the wheel, said stepped inner ring margin including axial and radial inner ring marginal portions with the axial ring portion having means embedded within the material of the non-metallic tire side wall ring member to prevent radial pull-out of the ring simulating member when mounted in assembly with a wheel cover on a vehicle wheel, said means comprising strip-like elements extending circumferentially of the wheel in the axial inner ring marginal portion and formed to resist being displaced radially between the cover structure and the tire rim, said strip-like elements having offset projections spaced along the length thereof with the material of the ring extended transversely through the recessed areas defined between the projections in interlocking relation.

7. In a wheel structure including a tire rim having a terminal rim flange and a pneumatic tire mounted on the tire rim, a wheel cover structure for concealing the wheel including a non-metallic tire side wall ring simulating member bridged over the terminal rim flange with its outer margin adapted for engagement against the tire and with its inner annular margin adapted for abutment against the tire rim, said inner margin having means for discharging water and dirt during the rotation of the wheel structure which tends to collect on an axially outer side of the tire rim comprising circumferentially spaced generally radially outwardly extending grooved areas on the axially inner side of the side wall ring member defining drain grooves for allowing water to be discharged radially of the wheel structure.

8. In a wheel structure including a tire rim having a terminal rim flange and a pneumatic tire mounted on the tire rim, a wheel cover structure for concealing the wheel including a non-metallic tire side wall ring simulating member bridged over the terminal rim flange with its outer margin adapted for engagement against the tire and with its inner annular margin adapted for abutment against the tire rim on an axially outer side of the tire rim axially spaced from the pneumatic tire, said inner margin having circumferentially spaced generally radially outwardly extending grooved areas on the axially inner side of the side wall ring member defining drain grooves for allowing water to be discharged radially of the wheel structure, said grooves extending along the axially inner surface of the ring member and along the entire radial extent of the ring member allowing water to discharge radially outwardly of the non-metallic tire side wall ring simulating member.

9. The wheel structure of claim 7 further characterized by interlock means comprising circumferentially spaced bands embedded in the inner ring margin to prevent radial pull-out when the ring member is mounted on a wheel.

10. In a wheel structure including a tire rim having intermediate radial and terminal rim flanges and a pneumatic tire mounted on the tire rim, a wheel cover for disposition on the wheel and a non-metallic tire side wall ring simulating member bridged over the terminal rim flange with its outer margin disposed opposite the tire and with its inner stepped ring margin including axial and radial ring portions engaged with the intermediate and radial rim flanges but spaced radially inwardly of the terminal rim flange, said cover having a cover area bearing against the radial ring portion to secure the ring against the radial rim flange but leaving an axial gap between the radial rim flange and said cover area, the axial ring portion having means permanently molded therein to resist radial pull-out of the axial ring portion through said gap, said means comprising circumferentially spaced strip-like elements extending circumferentially of the wheel in the axial ring portion and formed to resist being displaced with the axial ring portion radially through said gap between the cover structure and the tire rim.

11. The wheel structure of claim 10 further characterized by said strips being generally V-shaped.

12. The wheel structure of claim 10 further characterized by said strips having recessed areas with the material of the ring lodged in locking relation therein.

13. The wheel structure of claim 10 further characterized by said strips being generally arcuate in a circumferential direction.

14. The wheel structure of claim 10 further characterized by said strips being of a dimension in excess of the dimension of the gap to resist radial slippage.

15. In a wheel structure including a tire rim for carrying a pneumatic tire, a non-metallic tire side wall ring simulating member adapted to be disposed over a vehicle wheel including its tire rim, said non-metallic member having an outer margin and an axially inwardly directed margin inset axially inwardly of the outer margin member and sized for radial confrontation with respect to a radially inner surface of an axial rim flange, interlock means permanently molded and embedded in said axially inwardly directed margin, said means comprising circumferentially spaced bands each having a radially facing edge for wedged engagement against a radial surface of a rim flange, and a cover member engaged against said axially inwardly directed margin and backing up said bands and having means for sustaining the cover member as well as the non-metallic member on a vehicle wheel.

16. The wheel structure of claim 15 further characterized by said bands being totally embedded in said axially inwardly directed margin.

17. The wheel structure of claim 15 further characterized by said bands each being totally embedded in said axially inwardly directed margin except for a generally radially and axially outwardly extending band leg which extends radially outwardly beyond said margin for engagement with a radially inner surface on an axial rim flange.

References Cited in the file of this patent

UNITED STATES PATENTS

| | | |
|---|---|---|
| 1,323,457 | Holczer | Dec. 2, 1919 |
| 1,878,441 | Green | Sept. 20, 1932 |
| 2,621,979 | Barnes | Dec. 16, 1952 |
| 2,624,634 | Lyon | Jan. 6, 1953 |
| 2,696,409 | Barnes | Dec. 7, 1954 |
| 2,819,119 | Perrin | Jan. 7, 1958 |
| 2,862,769 | Wood | Dec. 2, 1958 |
| 2,937,426 | Barnes | May 24, 1960 |
| 2,964,357 | Barnes | Dec. 13, 1960 |

FOREIGN PATENTS

| | | |
|---|---|---|
| 1,061,278 | France | Nov. 23, 1953 |
| 916,386 | Germany | Aug. 9, 1954 |